United States Patent [19]

Haroun et al.

[11] Patent Number: 5,694,831
[45] Date of Patent: Dec. 9, 1997

[54] TOASTER OVEN APPLIANCE

[76] Inventors: Robert M. Haroun, 9 Marine Ave., Westport, Conn. 06880; Joseph Sofer, 201 E. 87th St. Apartment #30R, New York, N.Y. 10173

[21] Appl. No.: 622,750

[22] Filed: Mar. 27, 1996

[51] Int. Cl.[6] .................................................. A47J 37/08
[52] U.S. Cl. ........................... 99/339; 99/340; 99/357; 99/385; 99/389; 219/400; 219/521
[58] Field of Search .......................... 99/339, 340, 329 P, 99/329 RT, 385–392, 400, 401; 219/521, 492, 386, 405, 400

[56] References Cited

U.S. PATENT DOCUMENTS

| | | | |
|---|---|---|---|
| 1,955,867 | 4/1934 | Wilkie et al. | 53/5 |
| 1,996,297 | 4/1935 | Langenfeld | 219/19 |
| 2,711,684 | 6/1955 | Taylor | 99/340 |
| 2,862,441 | 12/1958 | Schmall | 99/340 |
| 2,920,551 | 1/1960 | Schmall | 99/329 |
| 3,823,658 | 7/1974 | Pinchot | 99/340 |
| 4,188,867 | 2/1980 | DeRemer | 99/385 |
| 4,889,042 | 12/1989 | Hantz et al. | 99/340 |
| 5,216,944 | 6/1993 | Trujillo | 99/339 |
| 5,402,708 | 4/1995 | Krasznai et al. | 99/385 |

*Primary Examiner*—Timothy F. Simone
*Attorney, Agent, or Firm*—Sofer & Haroun, LLP

[57] ABSTRACT

Electrical household appliance which permits simultaneous toasting of bread and cooking of food in separate cavities which are arranged within a housing in perpendicular relationship and each of the cavities being provided with respective heating elements. Bread slices are inserted into the toaster cavity from slots on the top of the appliance and are toast in the vertical position while other articles of food are inserted horizontally into the oven cavity through an opening on the front side of the appliance. The food articles in the oven cavity can be cooked while bread is toasting in the toaster cavity. The appliance is provided with controls for adjusting the temperatures and times for toasting and cooking. One of the heating elements utilized in the toaster cavity may be shiftable from a first position in the toaster compartment to a second position in the oven cavity.

18 Claims, 4 Drawing Sheets

TOASTER OVEN APPLIANCE

FIELD OF THE INVENTION

This invention relates to a unitary toaster and toaster oven appliance, and more particularly, to a combination pop-up toaster and toaster oven capable of both toasting slices of bread in a vertical toaster cavity while cooking or heating larger articles of food in a horizontal toaster cavity.

BACKGROUND OF THE INVENTION

There are currently in the marketplace today, two types of toasters. The first type is the conventional toaster oven which is used for heating meals, defrosting food, as well as toasting bread. Typically, such toaster ovens are provided with a large interior cavity into which food products such as muffins, bagels, or even small side dishes may be placed. A glass door provides access to the cavity and allows visual observation of the meal being prepared.

The benefits of such a toaster oven are evident as food may be quickly defrosted, warmed or even cooked, all without operating the large oven or stove found in most kitchens. However, these conventional toaster ovens have considerable drawbacks when used to toast bread and other products. For example, conventional toaster ovens utilize at least two sets of heating elements, a lower set placed below the grill and an upper set placed above the grill. In order to accommodate the food to be heated, the upper heating elements are placed relatively far away from the grill in contrast to the lower heating elements which are much closer to the grill. For example, in a conventional General Electric toaster-oven, the lower heating elements are about one inch from the grill, with the upper heating elements place about seven inches from the grill. Since the upper set of heating elements is spaced farther from the bread than the lower set, the underside of the bread is quickly toasted as compared with the top side of the bread. This results in uneven toasting of bread products.

The second type of toaster is the conventional "pop-up" toaster. Such toasters are provided with two, four, six, or even more slots into which bread may be inserted. A side lever is depressed which moves the bread into the toaster, but most importantly, completes a circuit allowing the bread to be toasted to a desired level. When the desired toasting level is reached, the toast automatically "pops up" and thus provided both an auditory and visual indication that the bread is done. However, such conventional "pop-up" toasters cannot heat or warm food items other than food that can fit in the toaster slot which necessitates the use of two appliances, one devoted exclusively to toasting and one devoted to heating.

Appliances combining the functions of toaster and oven have been proposed. Certain of these known appliances carry out the toasting of bread and the cooking (and/or heating) of food in the same cavity or in the same service position and with the same mode of heating.

For example, U.S. Pat. No. 4,889,042 to Hantz et al. discloses a combined toaster and oven appliance. Hantz, however, discloses an appliance having two parallel heating cavities on the same face of the appliance, a wide cavity for heating and cooking foods and a thinner cavity for toasting bread slices. For heating and cooking foods, the Hantz device is set on a surface with its cavities oriented in the horizontal position. For toasting, the Hantz appliance must be manually rotated 90 degrees so that the cavities are now oriented vertically to permit upright insertion of bread slices into the thinner cavity to be lowered into the appliance for toasting, much like toasting bread in a convention pop-up toaster.

Other known devices are bulky and overly cumbersome, and have the capability of utilizing only the toaster or oven compartment while the other must remain idle.

OBJECTS AND SUMMARY OF THE INVENTION

Accordingly, it is a general object of the present invention to provide a combination toaster and toaster oven appliance, which performs simultaneous toasting of bread and cooking or heating of food articles in a compact, economical appliance.

In accordance with the present invention, a unitary combination toaster and toaster oven is provided which utilizes a housing having a horizontal cavity and a vertical cavity arranged perpendicular to each other within the housing. Each of these cavities are provided with its own heating elements which permit simultaneous toasting of bread and cooking or heating of food articles. In a preferred embodiment, the appliance has a six-sided housing of substantially parallelepipedal shape and sits upon a flat surface, such as a kitchen countertop, to receive foods on a tray or grill. The grill is horizontally slideable in and out of a large cavity known as the oven cavity. The oven cavity which extends horizontally within the appliance and which occupies substantially all of the front face of the housing, includes a door which can be opened and closed for inserting and removing foods. The cooking time and temperature of the oven cavity are controlled by a knob or dial which is rotatably mounted on the housing and connects with the appliance's electrical heating circuitry.

The appliance is also provided with a second cavity, known as the toaster cavity, which is relatively smaller than the first cavity. Toasting is accomplished in this cavity by placing a food product such as a bread slice into the toaster cavity through a slot on the top side of the appliance. The bread, which is inserted in an upright position, is lowered into the toaster cavity by depressing a lever, button or the like on the housing, much in the same way bread is lowered into a stand alone pop-up toaster. In this preferred embodiment, the toaster cavity and the oven cavity are each provided with their own heating means so that the heating means for each cavity work independently of each other to permit simultaneous heating and toasting of food and/or bread articles in both cavities. In general, the toaster cavity is provided with means for heating the toast so that the bread can be toasted to a desired brownness or crispness and with an even amount of toasting on both sides of the bread slices.

In an alternative embodiment, the housing is provided with a passageway which extends internally in the housing between the toaster cavity and the oven cavity. The passageway permits, within its confines, the slidable exchange of one of the heating elements from a first position in the toaster cavity to a second position in the oven cavity and vice versa.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

Other objects and many of the attendant advantages of this invention will be readily appreciated as the same become better understood by reference to the following detailed description when considered in connection with the accompanying drawings wherein like reference characters denote similar elements throughout the several views.

Figure 5:
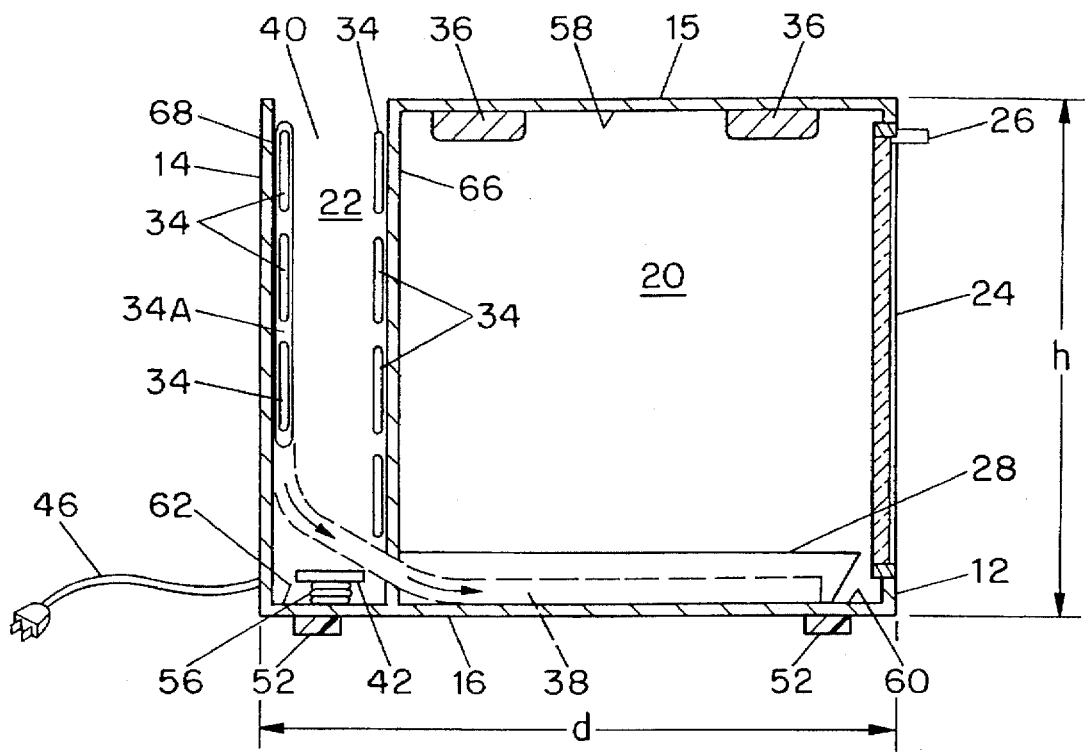
Figure 6:
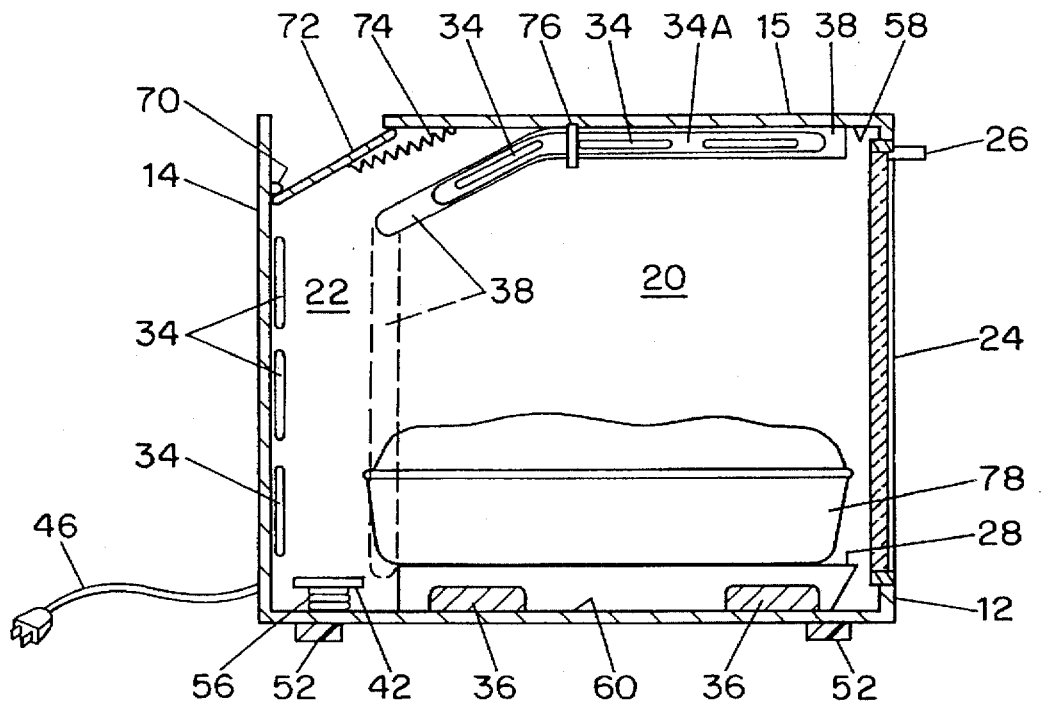

FIG. 5 is a cross sectional view of an alternative embodiment of the present invention illustrating an alternative configuration of the track for shifting a set of heating means from a first position in the toaster cavity to a second position in the oven cavity or vice versa; and FIG. 6 is a cross-sectional view of an alternative embodiment of the present invention illustrating the track having a sealing flap for closing of the toaster slots of the housing of the appliance.

DETAILED DESCRIPTION OF THE PRESENTLY PREFERRED EMBODIMENT

Figure 1:
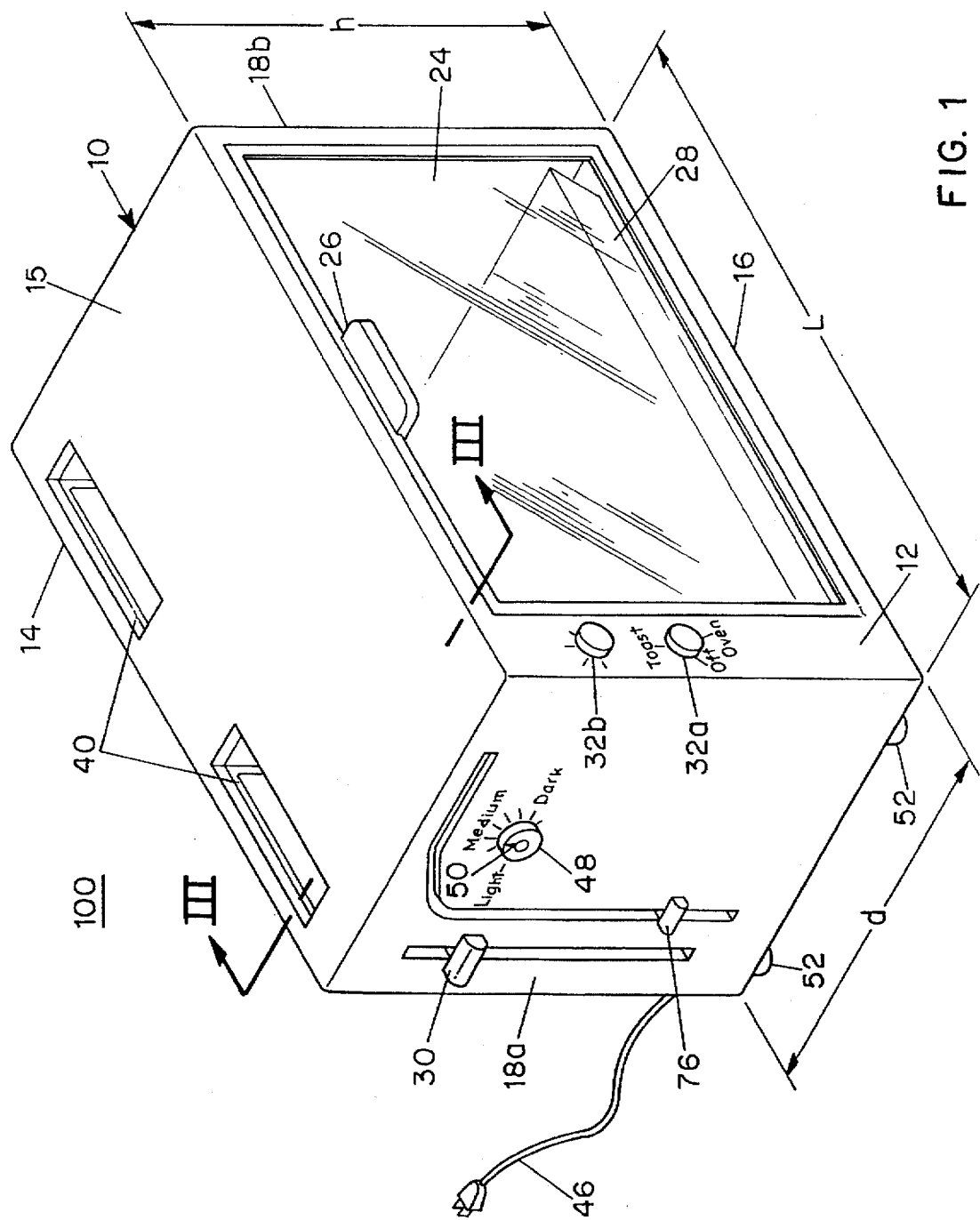
FIG. 1 is a perspective view of the presently preferred embodiment of the present invention.

Referring now to the drawings for a more detailed description of the present invention and more particularly to FIG. 1 thereof, a combination toaster and toaster oven appliance 100 in accordance with one embodiment of the invention is shown and described, although the invention is not limited in scope to this embodiment. Specifically, appliance 100 includes a housing 10 having front side 12, back side 14, top side 15, base 16 and side walls 18a and 18b. The housing has height h, length L, and depth d. At least one toaster slot 40 is disposed on top side 15. Base 16 of housing 10 is provided with a plurality of feet 52 which support the appliance 100 on a surface while keeping the base 16 elevated off the surface. Cooking control means 32a and oven timer 32b are disposed on front side 12 of housing 10. Toaster control means 48 and toaster lever means 30 are disposed on sidewall 18b, though they may alternatively be disposed on sidewall 18a. An electrical cord and plug 46 is provided for plugging into any household electrical outlet.

Figure 2:
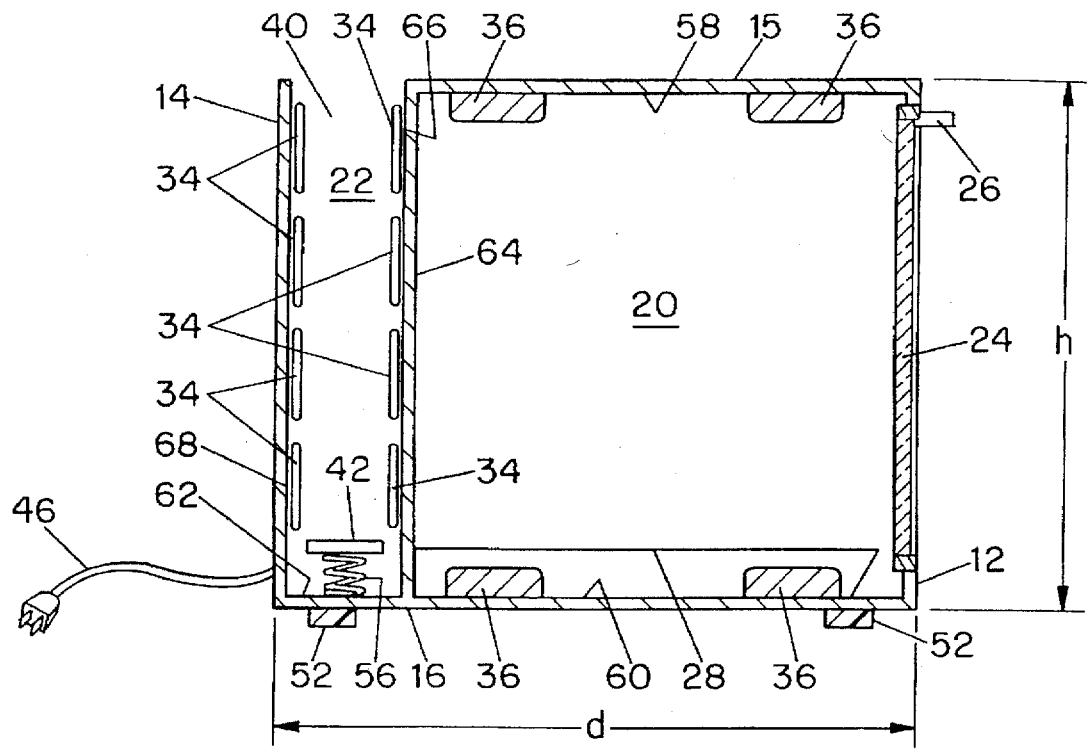
FIG. 2 is a perspective view of the presently preferred embodiment of the present invention as illustrated in FIG. 1 illustrating the interior of the presently preferred embodiment.
Figure 4:
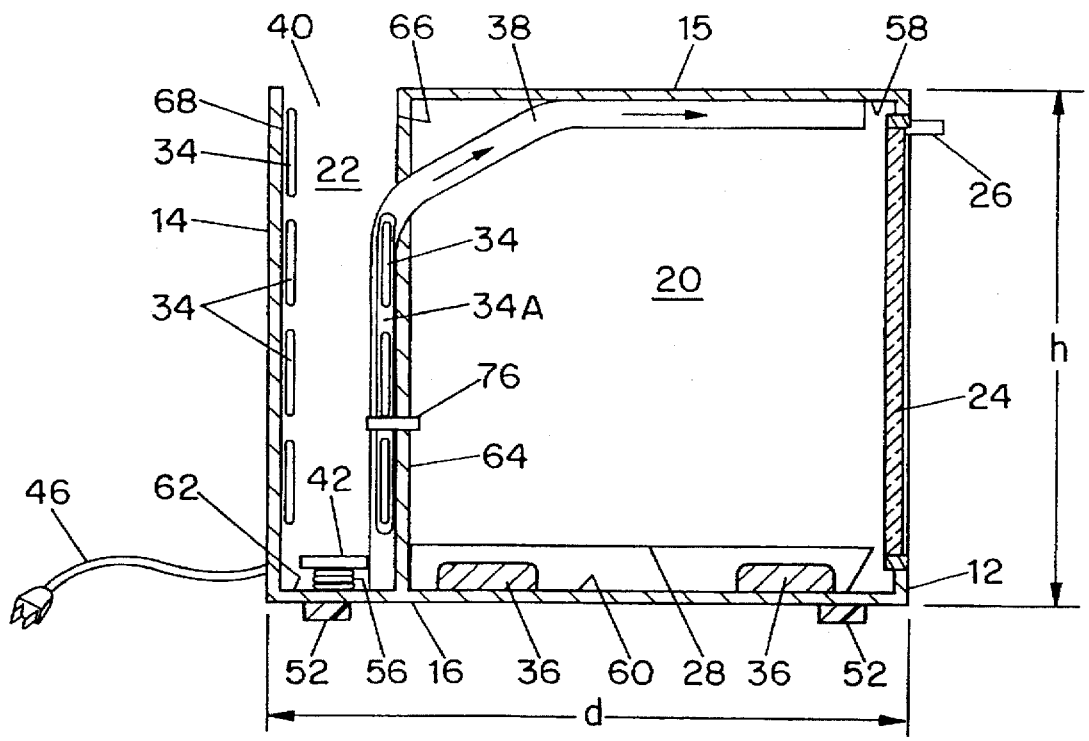
FIG. 4 is a cross-sectional view of an alternative embodiment of the present invention illustrating the track for shifting a set of heating means from a first position in the toaster cavity to a second position in the oven cavity or vice versa.

With reference to FIGS. 2 and 4, housing 10 is comprised of two compartments, namely an oven cavity 20 and a toaster cavity 22. Oven cavity 20 is disposed within housing 10 and extends horizontally from front side 12 of housing 10 so that upper surface 58 and lower surface 60 of oven cavity 20 are parallel with and adjacent to top side 15 and base 16. Since upper surface 58 and lower surface 60 of oven cavity 20 lie adjacent top side 15 and base 16, respectively, the height of oven cavity 20 is substantially equivalent to the height h of housing 10. Furthermore, oven cavity 20 extends lengthwise within housing 10 from sidewall 18a to sidewall 18b. Thus, the length of oven cavity 20 is substantially equal to the length L of housing 10. Front side 12 of housing 10 is an openable side having a transparent door 24 attached thereto for placing and removing articles from within oven cavity 20. Transparent door 24 is provided with handle means 26 for opening and closing door 24. A grill plate or tray 28 (shown in FIG. 2) may be disposed within oven cavity 20 for placement of food articles thereon while heating or warming.

As further illustrated in FIGS. 2 and 4, toaster cavity 22 is defined by at least one slot opening 40 on top side 15 of housing 10 and has a first toaster cavity sidewall 66, a second toaster cavity sidewall 68 and a toaster floor 62. Toaster cavity 22 extends vertically downward from slot 40 into housing 10 and culminates at toaster floor 62 just proximate the interior surface of base 16 of housing 10. As such, toaster cavity 22 extends within housing 10 such that its height is substantially equivalent to the height h of housing 10. Furthermore, the innermost back wall 64 of oven cavity 20 abuts first toaster cavity sidewall 66 within housing 10. Second toaster cavity side wall 68 abuts the interior surface of back side 24 of housing 10. As such, the depth of oven cavity 20 plus the depth of master cavity 22 substantially comprises the entire depth of housing 10.

With further reference to FIGS. 1 and 4, cooking control means 32a and oven timer 32b are preferably mounted on front side 12 of housing 10, but may also be mounted on another side of housing 10, such as sidewalls 18a or 18b. Cooking control means 32a and oven timer 32b are preferably configured as knobs or dials rotatably mounted on one of the aforementioned sides of the housing 10, but the control means 32a may alternatively take the form of switches and or levers slidably mounted on the housing 10.

A bread supporting rack 42 is shown in FIGS. 2, 4 and 6, and is disposed in toaster cavity 22 for holding bread slices (not shown) during toasting. A spring means 56 or other resilient means is disposed within toaster cavity 22 for controlling and maintaining the lowering and raising movement of bread supporting rack 42 within toaster cavity 22. As illustrated in FIG. 1, toaster lever means 30 is provided for lowering bread slices into toaster cavity 22 by lowering bread supporting rack 42 within toaster cavity 22 and for commencing and controlling the toasting and heating process in the toaster cavity 22. The degree of toasting desired is controlled by toaster control means 48. Toaster lever means 30 and toaster control means 48 are preferably mounted on side 18a or 18b and are preferably arranged next to each other.

FIGS. 2 and 4 illustrate toaster heating means 34 and oven heating means 36 disposed within toaster cavity 22 and oven cavity 20, respectively. Toaster cavity heating means 34 are preferably mounted on both first toaster cavity side wall 66 and second toaster cavity sidewall 68 of toaster cavity 22. Oven cavity heating means 36 are preferably mounted on the interior of top side 15 of housing 10 and on the interior of base 16 of housing 10. In the preferred embodiment of the present invention, toaster heating means 34 and oven heating means 36, are supplied by separate control devices, namely toaster lever means 30 which controls toaster heating means 34 and cooking control means 32a which controls oven heating means 36. The housing 10 may also include additional dials or knobs (not shown) for controlling toasting and cooking levels and for timing the toasting and cooking processes, such as oven timer 32b shown in FIGS. 1 and 3.

The types of toaster heating means 34 and oven heating means 36 utilized are known in the art. Heating means of the flat ribbon type used in automatic toasters, heating resistors, or elongated bars of electrical insulating material having electrical resistance wire wrapped around the elongated bars can be provided. The present invention is no way limited to these types of heating elements, and those skilled in the art may substitute others which perform the identical functions.

For use of the appliance of the present invention solely to toast breads, one or more slices of bread are inserted into toaster slots 40. To activate the toasting process, toaster lever means 30 is depressed. The depression of toaster lever means 30 lowers the bread slice(s) into toaster cavity 22 and subsequently activates the electrical toasting process.

Generally, prior to commencing the toasting process, the desired level of toasting is set using toaster control means 48 which is preferably mounted on housing 10 proximate toaster lever means 30. The desired level of toasting is selected by adjusting or turning the toasting level means 48 so that a pointer 50 imprinted on the toasting control means 48 points anywhere within the range of "light" through "dark", depending on the user's preference. This has the effect of adjusting a timing portion of the toaster control 48 so that the toasting cycle is governed to produce the desired color of toast.

After toaster control means 48 have been properly adjusted, toaster lever means 30 is depressed. This has the effect of unlatching the bread supporting rack 42 which has been latched in its upper non-toasting position, and allows it to lower into the toaster cavity 22 to be toasted. Further, depressing the toaster lever means 30 also causes the toaster cavity heating means 34 to be energized and starts the timer portion of the control 48 to operate. Energizing the toaster cavity heating means 34 radiates heat energy which toasts the bread. After the timer portion has operated to time the toasting period, its signals completion of the toast by adjusting a switching portion of the control 48 in such a manner that the heating means is de-energized and the spring means 56 for the bread supporting rack 42 is energized causing the bread rack to be elevated to its upper non-toasting position. On reaching the upper position, the bread rack is latched, resulting in de-energizing of the spring means 56.

If during the toaster cavity operation, the user desires to terminate the toasting cycle, this can be accomplished by raising the toaster lever means 30. Regardless of the time during the toasting period when this is done, it will result in de-energizing the toaster cavity heating means 34 and energizing spring 56.

If it is desired to utilize the oven cavity 20 to either toast one or more slices of bread, perhaps bread too thick to toast in the toaster cavity 22, or to warm or cook an article of food, such as pizza, frozen dinners or any of a variety of other foods, door 24 is opened, and the bread or food is placed on tray 28 within oven cavity 20. Door 24 is then closed. Generally, to toast breads within oven cavity 22, cooking control means 32a is turned so that its pointer (not shown) points to "toast", while oven timer 32b may be used to indicate the "light" to "dark" toasting preference. To warm or cook an article of food in oven cavity 20, the pointer of cooking control means 32a is directed to the "oven" setting, and then oven timer 32b is directed to the requisite timing for warming or cooking the article of food. Activating the warming/cooking mode has the effect of placing into a built-in electrical control circuit (not shown), a flasher which is designed to intermittently energize it. This results in the oven heating means 36 warming the oven cavity 20 up to the preset warming/cooking temperature without appreciably toasting the food articles therein. If oven timer 32b is set prior to commencing cooking or warming of a food article, the expiration of time on the oven timer 32b automatically de-energizes the oven cavity heating means 36. When it is desired to manually terminate oven cavity warming or cooking, cooking control means 32a is turned to the "off" position. This has the effect of de-energizing the oven cavity heating means 36.

Since toaster cavity 22 and oven cavity 20 are provided with their own separate heating means 34, 36, respectively, both the toaster cavity and the oven cavity may be utilized simultaneously to both toast bread and warm or cook articles of food at the same time. Simultaneous toasting and cooking/warming requires only activating the heating means 34, 36 of the toaster cavity 34 and the oven cavity 36 simultaneous in the manner heretofore discussed for the individual use of each respective cavity.

Figure 3:
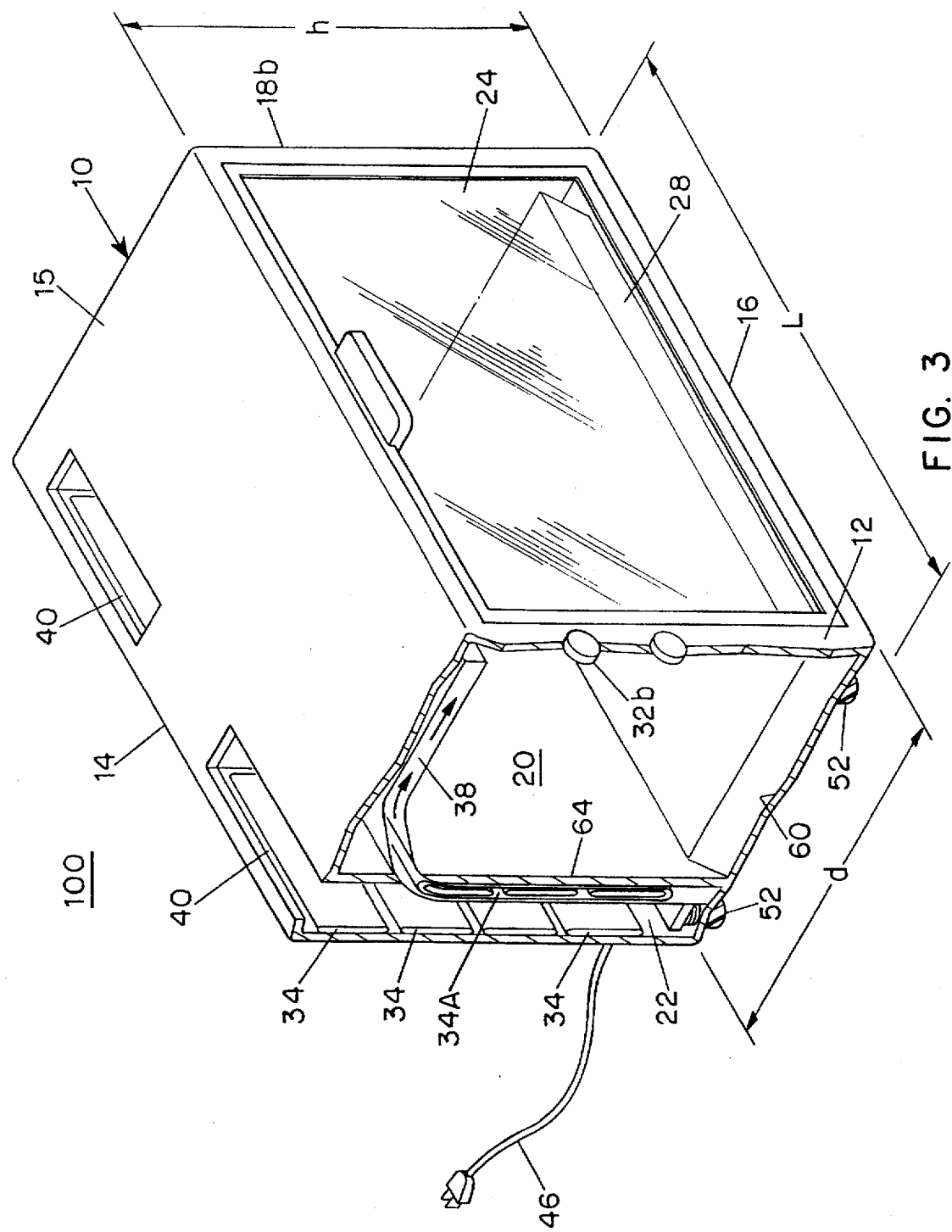
FIG. 3 is a cross-sectional view of the present invention viewed along the line III—III of FIG. 1.

In an alternative embodiment of the present invention illustrated in particular by the cut-away section of housing 10 in FIG. 3, appliance 100 is provided with a track or passageway 38 located within housing 10 for permitting the movement of heating unit 34A between toaster cavity 22 and oven cavity 20. Like the embodiment illustrated in FIGS. 1 and 2, the alternative embodiment of FIG. 3 retains the same spatial configuration whereby oven cavity 20 extends horizontally inward from front side 12 of housing 10. Second toaster cavity wall 68 abuts the interior surface of back side 14 of housing 10. Additionally, upper surface 58 and lower surface 60 of oven cavity 20 lie adjacent to top side 15 and base 16 of housing 10. Likewise, toaster cavity 22 extends from slot 40 on top side 15 of housing to toaster floor 56. As such, both oven cavity 20 and toaster cavity 22 extend within housing 10 such that their respective heights are substantially equal to the height of housing 10. Additionally, since back wall 64 of oven cavity 20 abuts first toaster cavity wall 66 and second toaster cavity wall 68 abuts back side 14, the total depth of oven cavity 22 plus toaster cavity 20 substantially comprises the entire depth of housing 10. To facilitate movement of heating unit 34A, a lever 76 is provided as shown in FIGS. 1, 4 and 6.

The shifting of heating elements through track 20 effectively eliminates one set of heating means from within oven cavity 20 which is thus provided with oven cavity heating means 36 mounted only on the interior surface of base 10. With reference to FIG. 4, housing 10 is provided with a track or passageway 38 within which toaster heating means 34 are disposed while in a first vertical position substantially parallel with back side 14 of housing 10. The lever 76 protrudes outward from this track 38 to facilitate movement of the heating unit 34A. For space saving purposes within housing 10, track 30 generally lies adjacent the interior of back side 14 of housing 10 and adjacent either the interior of top side 15 or base 16. Within track 30, toaster heating elements 34 are shiftable as a unit from a substantially vertical first position in toaster cavity 22 to a substantially horizontal second position proximate the interior surface of housing 10 adjacent top side 15. Alternatively, as illustrated by FIG. 5, the oven cavity 20 may be provided with oven cavity heating means 36 mounted only on the interior surface of top side 10. Track 20 will then be configured to allow toaster heating means to 34 to be shifted from a vertical first position substantially parallel with toaster cavity 22 to a substantially horizontal second position proximate the interior surface of housing 10 adjacent base 16. Ball bearings (not shown) disposed within track 30 may facilitate the shifting of toaster heater means 34 between the first vertical position in toaster cavity 22 and the second horizontal position in oven cavity 20. Alternatively, toaster heating elements 34 may be provided having guide wheels (not shown) mounted thereon which slidably engage with the track 30 to permit movement between the first and second positions. Those skilled in the art will realize that other movement or shifting means may be utilized to permit the shift of heating elements between toaster cavity 22 and oven cavity 20.

In another embodiment of the present invention shown in FIG. 6, housing 10 is provided without first toaster cavity sidewall 66 or back wall 64 of oven cavity 20. A sealing flap 72 is located proximate slot 40. As toaster heating unit 34A is shifted by lever 76 within track 38 from its vertical position in toaster cavity 22 to its horizontal position in oven cavity 20, sealing flap 72 is raised up within toaster cavity 22 and abuts engagement stop 70 on second toaster cavity sidewall 68. Upon engagement of sealing flap 72 with engagement stop 70, sealing spring 74 causes sealing flap 72 to securely close the opening of slots 40. As a result of the closing of slots 40 by sealing flap 72, the heat is contained within oven cavity 20. When the heating unit 34A is shifted by lever 76 back to its vertical position in the toaster cavity 22, the sealing flap 72 may be opened upon insertion of a slice of bread into slot 40. Once opened, sealing flap 72 is biased in the open position by sealing spring 74. Moreover, as no first toaster cavity sidewall 66 or back wall 64 of oven cavity 20 are located within the housing 10, the food article 78 as shown in FIG. 6 may be placed within both oven 20 and toaster 22 cavities, thus allowing substantially all of the depth d of the housing 10 to be utilized for heating and or warming the food article 78 by heating unit 34A and oven heating means 36. Toaster heating means 34 may be activated to provided additional warming of food article 78.

To permit removal of crumbs, and to clean the interior of the appliance, housing 10 may optionally be provided with an slot, opening or removable tray (not shown) on back side 14 of housing 10 to permit the removal of crumbs and facilitate cleaning of the interior of housing 10. Since bread crumbs or morsels of food articles inevitably fall to the base of the housing during cooking or toasting, it essential to remove these crumbs so that the appliance remains sanitary. Alternatively, base 16 may be openable or removable by way of a screw, snap or one of numerous connection methods known in the art, to permit removal or crumbs or morsels of food from the interior base 16 of the housing.

Thus, while there have been shown and described fundamental novel features of the invention as applied to preferred embodiments thereof, it will be understood that various omissions and substitutions and changes in the form and details of the disclosed invention may be made by those skilled in the art without departing from the spin of the invention. It is the intention, therefore, to be limited only as indicated by the scope of the claims appended hereto.

It is to be understood that the drawings are not necessarily drawn to scale, but that they are merely conceptual in nature.

What is claimed is:

1. A combination pop-up toaster and toaster oven appliance for toasting a first food article and for heating a second food article, the appliance comprising:

a housing having an openable front door, a back side, a top side, a base, side walls;

a toaster cavity extending vertically from a slot provided on the top side of the housing and extending downward for toasting the first food article, said toaster cavity provided with substantially parallel spaced first and second heating elements, said first and second heating elements defining a fixed depth of the toaster cavity, said first heating element coupled to said back wall of said housing, the toaster cavity having means for maintaining the first food article in an upright position as the first food article is toasted;

an oven cavity extending horizontally inward from the openable front side of the housing toward the second toaster heating element for heating the second food article, the oven cavity having a depth greater than the depth of the toaster cavity, wherein the depth of the oven cavity plus the depth of the toaster cavity combined is substantially equivalent to the depth of the housing; and oven heating means mounted within the oven cavity for warming and cooking food articles.

2. The appliance in accordance with claim 1, wherein the depth of the oven cavity and the depth of the toaster cavity combined are substantially equal to the depth of the housing.

3. The appliance in accordance with claim 1, wherein the oven cavity is substantially parallel to the base of the housing.

4. The appliance in accordance with claim 1, wherein the toaster cavity and the oven cavity extend within the housing in perpendicular fashion relative to each other.

5. The appliance according to claim 1, wherein the toaster cavity and the oven cavity have a height substantially equal to the height of said housing.

6. The appliance in accordance with claim 1, wherein the door is comprised of a substantially transparent material to permit viewing of the food article in the oven cavity, the door having a handle means mounted thereon for facilitating the opening and closing of the door.

7. The appliance according to claim 1, wherein the oven cavity is provided with a tray upon which an article of food is placed for cooking, the tray being slidably mounted within the oven cavity for facilitating insertion and removal of a food to and from the oven cavity.

8. The appliance according to claim 1, wherein the housing further comprises a lever means for lowering a slice of bread into the toaster cavity, whereby an electrical circuit is closed and the heating means is energized.

9. The appliance according to claim 1, further comprising a plurality of cooking and toasting control means rotatably mounted on one surface of the housing for commencing, concluding and controlling the temperatures and cooking and toasting times of the food articles in the oven and toaster cavity.

10. The appliance according to claim 1, wherein the means for maintaining the first food article comprises a bread rack for holding bread slices within the toaster cavity.

11. A combination pop-up toaster and toaster oven appliance for toasting a first food article and for heating a second food article, the appliance comprising:

a housing having an openable front door, a back side, a top side, a base, and side walls, said housing having a fixed depth defined between said openable front door and said back side;

a toaster cavity extending vertically from a slot provided on the top side of the housing and extending downward for toasting the first food article, said toaster cavity provided with substantially parallel spaced apart first and second heating elements, said first and second heating elements defining a fixed depth of the toaster cavity, said first heating element proximate to said back wall of said housing, the toaster cavity having means for maintaining the first food article in an upright position as the first food article is toasted;

an oven cavity extending horizontally inward from the openable front side of the housing toward the back side of the housing for heating the second food article, the oven cavity having a depth greater than the depth of the toaster cavity, wherein the depth of the oven cavity plus the depth of the toaster cavity combined is substantially equivalent to the depth of the housing, wherein the depth of the oven cavity and the depth of the toaster cavity combined are substantially equal to the depth of the housing; and oven heating means mounted on the interior surface of the top side and on the base of the housing for warming and cooking food articles.

12. The appliance according to claim 11, wherein the oven heating means are comprised of at least two heating elements mounted within the oven cavity for cooking food therewithin.

13. The appliance according to claim 12 wherein the first oven heating means is mounted on the upper surface of the oven cavity on the interior of the top side of the housing, and a second set of oven heating means is mounted on the lower surface of the interior of the bottom side of the oven cavity.

14. A combination pop-up toaster and toaster oven appliance, comprising:

a housing of fixed height and fixed depth, the housing having six sides, namely a front side, a back side, a top side, a bottom side and two side walls, the front side of the housing having an opening which defines an oven cavity extending horizontally inward in the housing, the opening having a door attached to the housing;

at least two slots provided on the top side of the housing for receiving slices of bread, the slots extending downward into the housing to define a toaster cavity into which bread slices are lowered to be toasted;

the toaster cavity which extends vertically from the top side of the housing downward for toasting slices of bread is provided with means for containing the slices of bread in an upright position as the bread slices are toasted;

the oven cavity extending horizontally inward from the opening on the front side of the housing toward the back side of the housing for cooking articles of food;

toaster heating means mounted within the toaster cavity for toasting in the toaster cavity for toasting breads, the toaster heating means being arranged so as provide an equal amount of heating to both sides of bread slices placed within the toaster cavity;

oven heating means mounted on the interior surface of the top side and on the base of the housing for warming and cooking food articles; and a track extending from a first vertical position adjacent the back side of the toaster cavity and curving to a second horizontal position adjacent the top side of the housing for permitting movement of said toaster heating elements from said toaster cavity to said oven cavity.

15. The appliance of claim 14, wherein the toaster heating means in the toaster cavity is positionable between a first vertical position adjacent the toaster cavity to a second horizontal position adjacent the top side of the oven cavity.

16. The appliance of claim 15, wherein the toaster heating means in the toaster cavity is movably shiftable from a first vertical position adjacent the toaster cavity to a second horizontal position adjacent the base of the oven cavity.

17. The appliance of claim 16, wherein the first position of the toaster heating means is substantially vertical in adjacent relation with said back side of said housing.

18. The appliance of claim 17, wherein the second position of the oven heating means is substantially horizontal in adjacent relation with said top side of said housing.

* * * * *